United States Patent [19]

Margerum et al.

[11] Patent Number: 4,581,278

[45] **Date of Patent: * Apr. 8, 1986**

[54] THERMAL TRANSFER IMPRINTING

[75] Inventors: Edward S. Margerum, Salem; Norman A. Hiatt, Framingham, both of Mass.

[73] Assignee: Dennison Manufacturing Company, Framingham, Mass.

[ * ] Notice: The portion of the term of this patent subsequent to Sep. 13, 2000 has been disclaimed.

[21] Appl. No.: 513,576

[22] Filed: Jul. 14, 1983

Related U.S. Application Data

[63] Continuation-in-part of Ser. No. 194,694, Oct. 6, 1980, Pat. No. 4,404,249.

[51] Int. Cl.⁴ ........................ B32B 7/06; B32B 23/08; B32B 27/10

[52] U.S. Cl. .................................... 428/200; 156/230; 428/206; 428/207; 428/211; 428/216; 428/336; 428/337; 428/513; 428/913

[58] Field of Search ............... 428/200, 195, 207, 337, 428/336, 206, 211, 513, 216, 913; 427/152, 148; 430/200; 156/234, 239, 240, 230

[56] References Cited

U.S. PATENT DOCUMENTS

| | | | |
|---|---|---|---|
| 3,519,511 | 7/1970 | Coover | 156/234 |
| 3,567,571 | 3/1971 | Martinovich | 428/200 |
| 3,770,479 | 11/1973 | Dunning | 427/152 |
| 4,007,067 | 2/1977 | Dunning | 427/152 X |
| 4,084,032 | 4/1978 | Pasersky | 427/148 X |
| 4,294,641 | 10/1981 | Reed et al. | 427/148 |
| 4,404,249 | 9/1983 | Margerum et al. | 428/200 |

*Primary Examiner*—Thomas J. Herbert
*Attorney, Agent, or Firm*—George E. Kersey

[57] ABSTRACT

Thermal imprinting for example of one or more surfaces, using a heat transfer carrier and a release layer of pigmented, low molecular weight polyolefin. The imprint is made by bringing the transfer layer into contact with the surface of an object and applying heat. This releases the transfer layer to the surface being imprinted. When the transfer layer is required to have any significant thickness, it desirably includes a low melting point wax or resin to provide flexibility. The release characteristic can be improved by the inclusion of a further crystalline wax layer between the transfer layer and the carrier.

13 Claims, 5 Drawing Figures

THERMAL TRANSFER IMPRINTING

This is a continuation-in-part of Ser. No. 194,694 filed Oct. 6, 1980 and issued as U.S. Pat. No. 4,404,249 on Sept. 13, 1983.

BACKGROUND OF THE INVENTION

In thermal imprinting a carrier with a transfer layer is brought into contact with a receiving surface which is to be imprinted. Simultaneously with the contact of the carrier transfer layer with the surface that is to be imprinted, a heated die, i.e. printhead, is brought into engagement with the reverse side of the carrier. This brings about the release of the transfer layer from the carrier to the surface to be imprinted. When the carrier is withdrawn, the released transfer layer remains on the receiving surface and the imprinting is thus completed.

Thermal imprints are commonly made using heat transfer films, which are known as "hot stamp foils", or "roll leaves". The foil or leaf is typically a thin polypropylene or polyester film which is coated with a suitable transfer layer. The result is a laminate made up of the carrier and various layers of the transfer material.

Conventional transfer laminates typically employ at least three functional coatings, but a much larger number of coatings may be used, in some cases as many as eleven. In general, the greater the decorative effect that is desired the larger is the number of coatings that is needed.

Representative patents of the prior art include: U.S. Pat. Nos. 3,708,320; 3,600,256; 3,666,516; 3,949,139; 3,770,478; 3,770,479; 3,940,864; 4,053,672; 4,084,032; 4,007,067; and 4,047,996.

The prior art transfer laminates for heat transfer films require a significant number of separate layers, typically a separate layer for each of the various functions associated with the laminate. When the transfer film is used in creating a pictorial transfer, it is necessary to include pigment in a pattern. Since the transfer layer has to be releasable it is customary to include a coating that serves primarily a release function. The required inclusion of a large number of different layers in the laminate results in substantial cost and a significant use of materials.

Accordingly, it is an object of the invention to facilitate the production and use of heat transfer laminates and related structures. Another object is to reduce the required number of layers in the laminate needed to accomplish a prescribed set of functions. A related object is to reduce the cost of producing suitable heat transfer laminates. Another related object is to reduce the amount of required materials.

The most common employment of heat transfer laminates is for making decorative and coding imprintings. The latter consists of a set of alphanumeric characters which carry information about the product that has been imprinted.

Accordingly, it is still another object of the invention to facilitate the imprinting of objects. A related object is to facilitate the coded imprinting of objects.

Heat transfer films are commonly used in the imprinting of hard surfaces, for example, those associated with thermoplastic materials where conventional printing techniques can produce smudging or smear. Heat transfer films are also employed for the imprinting of resilient, nonporous and nonretentive surfaces. They are used to advantage with irregular surfaces where conventional imprints are unsatisfactory.

Accordingly, it is yet another object of the invention to facilitate the imprihting of nonporous, nonretentive, and irregular surfaces. A related object is to improve the efficiency with which heat transfer laminates can be used in the imprinting of resilient, porous, nonretentive, and irregular surfaces.

Another important use for heat transfer laminates is in the decoration of multidimensional objects. When conventional inks are used in this situation, it is necessary to permit each imprinted surface to dry before any further imprint can be made. In general, the conventional imprinting of multidimensional surfaces results in characters that tend to be blurred and lack sharpness. Thermal imprints permit high speed operation since there is no need for drying.

Accordingly, it is yet another object of the invention to increase the rate at which multidimensional objects can be imprinted. It is another object to achieve increased sharpness of character imprint. Still another object is to enhance the efficiency with which multidimensional imprinting can be achieved with heat transfer foils.

Still another important use of heat transfer laminates is in printing. Instead of using an impact ribbon, a laminate is used with a print head to accomplish a similar result. Accordingly, it is still another object of the invention to facilitate heat transfer printing.

SUMMARY OF THE INVENTION

In accomplishing the foregoing and related objects the invention provides a transfer coating which is particularly suitable for heat transfer laminates and is significantly reduced in complexity as compared with the laminates that are conventionally used with heat transfer films.

In accordance with one aspect of the invention, the transfer coating can employ a single layer which serves the same functions that have conventionally required the use of a plurality of individual layers.

In accordance with another aspect of the invention, a suitable transfer layer is realized using a pigmented polyolefin of low molecular weight, low softening point and moderate viscosity. Such a polyolefin has significant hardness and low tensile strength with little elongation. This results in the ready removal of pigment from the transfer layer in sharp and solid form. The relatively low softening point and moderate viscosity of the polyolefin aid in dispersion of the pigment. The result is improved imprintability of the pigment in the transfer coating as compared with conventional transfer laminate used in heat transfer films.

When the transfer layer is required to have any significant thickness, it desirably includes a low melting point resin or wax to provide suitable flexibility. In addition, the resin can contribute to adhesion, tack and cohesion of the transfer layer.

In accordance with another aspect of the invention, a layer of crystalline wax can be included between the transfer layer and the carrier. Crystalline wax can provide improved releasability. In general, a separate release layer is not required and the transfer layer alone has a suitable release characteristic.

In accordance with a further aspect of the invention, the pigment employed in the transfer layer provides suitable coloration and opacity. Dyes may be used in place of pigment, but they are less preferred because of their lesser heat and light stability and their inherent transparency.

In accordance with a still further aspect of the invention, the low molecular weight polyolefin is a polyethylene resin. It may be used in both emulsifiable and nonemulsifiable form. The molecular weight of a suitable polyethylene resin is below 10,000. The preferred molecular weight of the polyethylene resin is in the range from about 2000 to about 20,000, but other molecular weights can be employed as well. The softening point is in the range from 80° to 150° C. The viscosity is below about 20 poises per second.

In accordance with yet another aspect of the invention, the resin or wax component that is employed includes hydrocarbons and esters (lipids) of fatty acids and alcohol. They are thermoplastic and have a molecular weight between 250 and 4,000.

BRIEF DESCRIPTION OF THE DRAWINGS

Other aspects of the invention will become apparent after considering several illustrative embodiments taken in conjunction with the drawings in which.

DETAILED DESCRIPTION

Figure 1:
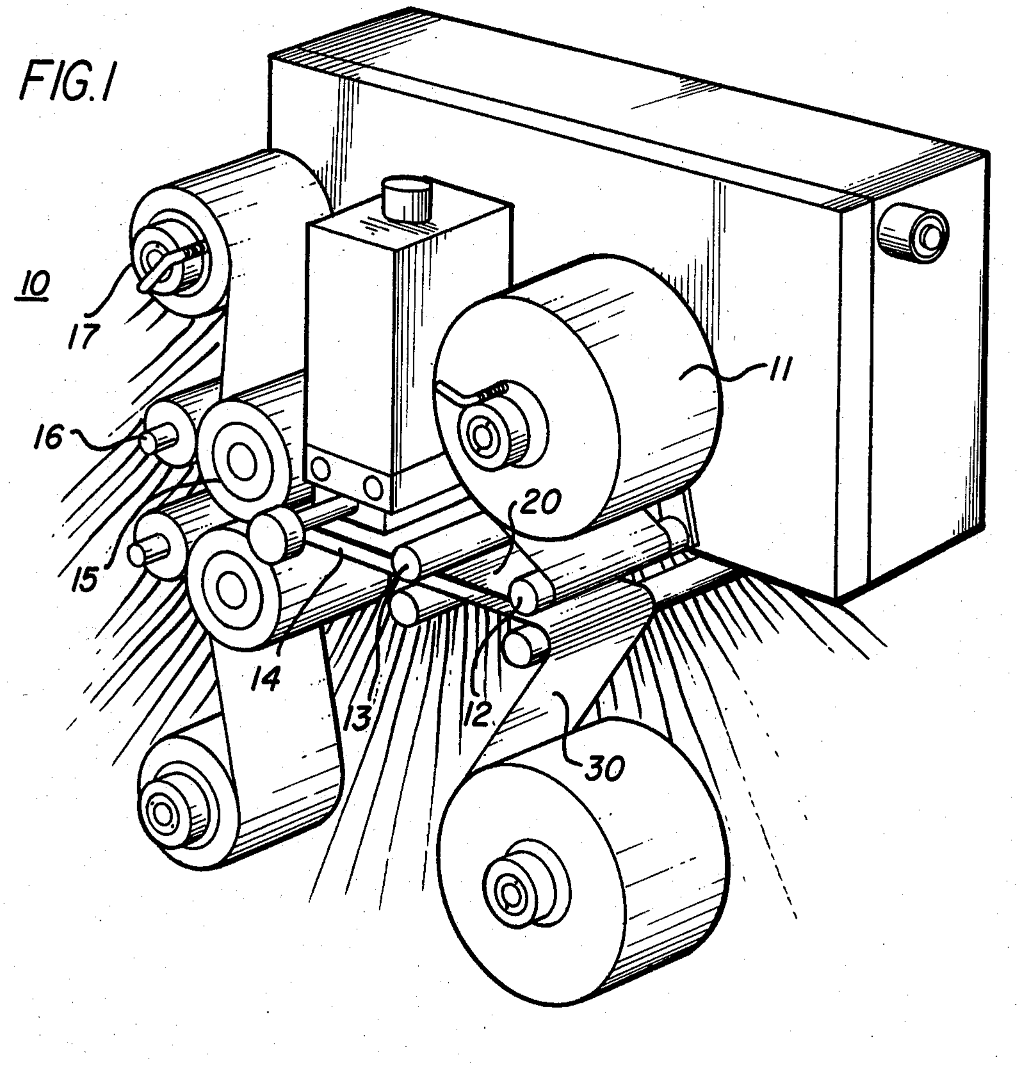
FIG. 1 is a perspective view of a thermal imprinting device for use in accordance with the invention.

With reference to the drawings, a thermal imprinting device for the practice of the invention is shown in FIG. 1. The imprinting device 10 is electromagnetically, or pneumatically operated and electronically controlled. It includes a roller 11 for a heat transfer laminate 20, which is formed by a thin carrier and a transfer coating as described below in connection with FIG. 3A. The heat transfer laminate extends from the roller 11 around a tension roller 12 to a guide roller 13. The laminate then passes below a type chase 14 to an advance roller 15. From the advance roller 15, the laminate extends to an advance adjustment roll 16 and then to a takeup roller 17.

Also shown in FIG. 1 is a representative roll 30 of flexible sheeting that is intended to be imprinted using the device 10. After the sheeting of the roll 20 is imprinted it can be used in a variety of ways, for example in making flexible packaging, or simply to provide a record member. Acting upon the type chase in the device 10 is a moveable head. The type chase 14 is removable for replacement with any other suitable arrangement of typeset according to the imprint that is to be made on the roll 20.

In operation, the laminate from the supply roller or reel 11 is advanced stepwise across the type chase 14 and the printhead is operated to heat the face and bring it into contact with the carrier side of the film, causing the selective release of the transfer layer and the imprint of the roll 30 according to the pattern of the type characters set in the face 14. This operation is summarized in FIG. 3B.

A suitable imprinter device 10 is the Metronic Model MO2 Hot Stamp Roll Leaf Printing Machine, which is distributed by the Control Print Packaging Systems Division of the Dennison Manufacturing Company, 67 Sand Park Road, Cedar Grove, N.J.

Figure 2A:
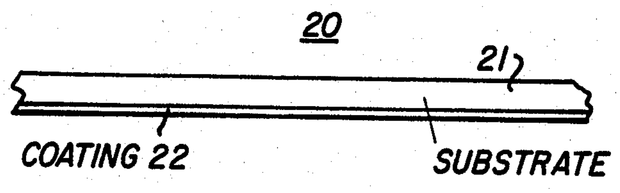
FIG. 2A is a longitudinal cross-sectional view of a composite thermal imprinting laminate in accordance with the invention.

A longitudinal cross-sectional view of the printing laminate 20 is shown in FIG. 2A. The laminate 20 includes a cellulosic carrier 21 with a superimposed transfer layer 22. The carrier 21 is of tissue, for example "condenser" paper or similar material. A suitable tissue sheeting has a thickness in the range from 0.5 to 1 mil. The coating 22 can be below 0.0002 inch in thickness and can range in thickness up to 0.002 inch. The coating 22 can be applied to the carrier 21 by extrusion using the type of coater that is commonly employed in hot melt coatings. It can also be applied by gravure, and other methods.

Figure 2B:
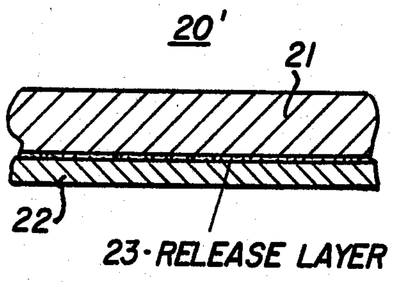
FIG. 2B is a longitudinal cross-sectional view of an alternative composite thermal printing laminate in accordance with the invention.

In an alternative embodiment of the film 20' shown in FIG. 2B, an intermediate release coating 23 is interposed between the carrier 21 and the transfer coating 22. The intermediate coating is desirably of crystalline wax and is used only where a supplemental release layer is desired. Thermal transfer laminates generally do not require the release coating 23 with the exception of formulations which do not have a sufficient transfer polymer to provide adequate release.

Figure 3A:
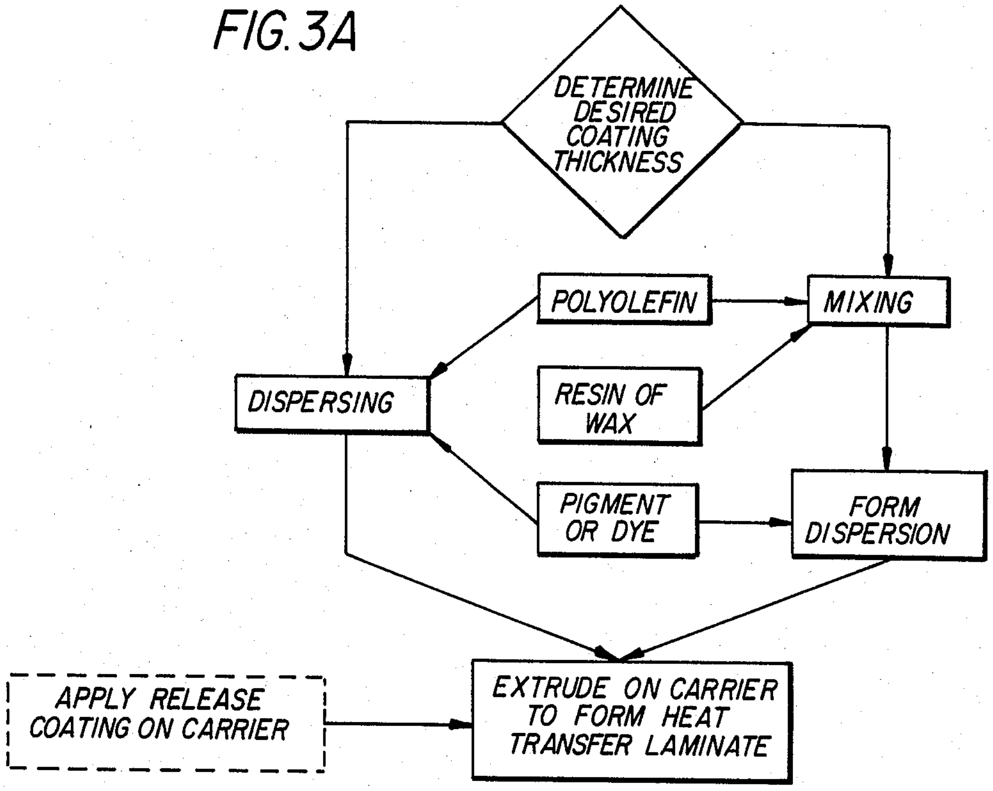
FIG. 3A is a flow chart for the production of a heat transfer laminate in accordance with the invention.
Figure 3B:
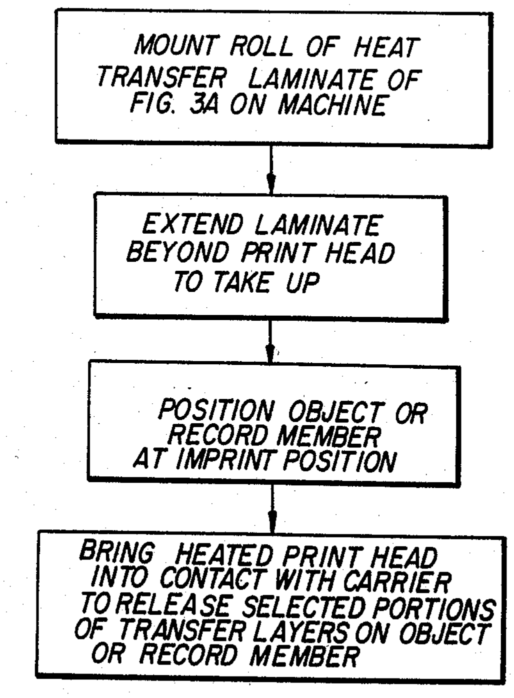
FIG. 3B is a flow chart illustrating the practice of the invention.

The laminate 20 in accordance with the invention is produced as summarized in FIG. 3A by mixing and dispersing the ingredients that form the transfer coating 22. The coating 22 is then extruded on a suitable substrate 21. The latter is in sheet form, which requires slitting and rewinding to provide the coil 11 pictured in FIG. 1 ready for use in the thermal imprinting device 10. The coating 22 is formed by mixing a pigment into polyolefin of low molecular weight. A suitable polyolefin is low molecular weight polyethylene having a softening point in the range from 80° to 150° C. and a molecular weight below 10,000.

The transfer layers 22 have a thickness below about 0.0002 inch. It has been found that the mixture of the polyolefin and pigment is sufficient to provide superior heat transfer imprints. In those applications, the amount of pigment varies between 15 and 50 percent and the polyolefin varies between 50 and 85 percent.

When the transfer coating is to have a thickness greater than 0.0002 it has been found desirable to add a low melting point resin. When a resin is employed in the transfer layer 22, the amount ranges up to 20 percent and the pigment and polyolefin are reduced correspondingly.

In some cases, the desired flexibility is enhanced by the substitution of wax for the resin or by the mixture of low melting point resin and wax. When waxes are used they can range up to 40 percent of the composition and the other ingredients are modified correspondingly.

In the case of the embodiment 20' which employs a release layer 23 between the film 21 and the transfer layer 22, the wax is a branched chain paraffin characterized by a crystal structure and a higher viscosity than is usually associated with normal wax. Such a wax is obtained by dewaxing tank bottoms and from refinery residues. Its average molecular weight is in the range from about 500 to 800, being about twice that of paraffin. Its viscosity is in the range of from about 45 to 125 cps per second. It has a penetration value in the range from about 3 to 33.

Further aspects of the invention will be appreciated from consideration of the following nonlimiting examples:

EXAMPLE I

A low molecular weight polyethylene sold and marketed under the name "Epolene E-12" amounting to 53.4 percent by weight of the final composition is mixed with a low melting point resin sold and marketed under the name "Foral" in an amount constituting 13.3 percent by weight of the final composition. Once the resin and low molecular weight polyethylene have been thoroughly mixed, a black pigment sold under the name "Uhlich L-2550" in an amount constituting 33.3 percent of the final composition is dispersed into the mixture of the resin and polymer. The resulting dispersion is extruded at a thickness in the range from 0.002 inch to 0.0002 inch on tissue having a thickness of 0.5 mil. The resulting coated sheeting is slit into a "foil" roll of a kind illustrated by the roll 11 in FIG. 1. The roll is then used with the machine of FIG. 1, and the result is a print which is readily removed from the transfer coating and remains sharp and solid with suitable opacity and coloration.

Typical properties of Epolene® E-12 are summarized in Table I below.

TABLE I

| | |
|---|---|
| Ring and Ball Softening Point, °C. | 112 |
| Penetration Hardness, 100 g/5 sec/25° C., tenths of mm | 1 |
| Density, 25° C. | 0.955 |
| Acid Number | 16 |
| Brookfield Thermosel Viscosity, cP[a] | |
| 125° C. (257° F.) | 250 |
| 150° C. (302° F.) | — |
| 190° C. (374° F.) | — |
| Color, Gardner Scale | 1 |
| Molecular Weight, approximate | 2,300 |

[a]Conventional Brookfield viscosity = 1.15 × Brookfield Thermosel viscosity.

EXAMPLE II

Example I is repeated with one of the following polyethylene substitutes for Epolene® E-12, having the characteristics summarized in Tables II and III below.

TABLE II

SUMMARY OF CHARACTERISTICS OF OTHER EMULSIFIED EPOLENE$^R$ WAXES

| Type and Number* | E-10 | E-11 | E-14 | E-15 | E-43 | E-45 |
|---|---|---|---|---|---|---|
| Ring and Ball Softening Point, °C. | 106 | 106 | 104 | 100 | 157 | 114 |
| Penetration Hardness 100 g/5 sec/25° C. tenths of mm | 2 | 3 | 4 | 7 | 0.1 | 1 |
| Density, 25° C. | 0.942 | 0.941 | 0.939 | 0.925 | 0.934 | 0.964 |
| Acid Number | 15 | 15 | 16 | 16 | 47 | 18 |
| Brookfield Thermosel Viscosity, cP[a] | | | | | | |
| 125° C. (257° F.) | 900 | 350 | 250 | 350 | [b] | — |
| 150° C. (302° F.) | — | — | — | — | [b] | 250 |
| 190° C. (374° F.) | — | — | — | — | 400 | — |
| Color Gardner Scale | 2 | 2 | 2 | 2 | 11 | 3 |
| Molecular Weight, | 3,000 | 2,200 | 1,800 | 3,400 | 4,500 | 2,100 |

[a]Conventional Brookfield viscosity = 1.15 × Brookfield Thermosel viscosity.
[b]Solid at this temperature.
*Type and Number designations are those of the manufacturer.

SUMMARY OF TABLE III

| | N-10 | N-11 | N-12 | N-14 | N-15 | N-34 | N-45 | C-10 | C-13 | C-14 | C-15 | C-16 | C-17 |
|---|---|---|---|---|---|---|---|---|---|---|---|---|---|
| Ring and Ball Softening Point, °C. | 111 | 108 | 117 | 106 | 163 | 103 | 123 | 104 | 110 | >133 | 102 | 106 | 133 |
| Penetration Hardness, 100 g/5 sec/25° C., tenths of mm | 2 | 2 | 1 | 3 | 0.6 | 5 | 0.1 | 3 | 3 | 2 | 4 | 3 | 2 |
| Density, 25° C., g/cc | 0.925 | 0.921 | 0.938 | 0.920 | 0.860 | 0.910 | 0.947 | 0.906 | 0.913 | 0.918 | 0.906 | 0.908 | 0.917 |
| Acid Number | <0.05 | <0.05 | <0.05 | <0.05 | <0.05 | <0.05 | <0.05 | <0.05 | <0.05 | <0.05 | <0.05 | 5[a] | <0.05 |
| Brookfield Thermosel Viscosity[b], C[P] | | | | | | | | | | | | | |
| 125° C. (257° F.) | 1500 | 350 | 450 | 150 | [d] | 450 | — | — | — | [d] | — | — | [d] |
| 150° C. (302° F.) | — | — | — | — | [d] | — | 500 | 7800 | — | — | 3900 | 8500 | — |
| 190° C. (374° F.) | — | — | — | — | 600 | — | — | — | — | — | — | — | — |
| Melt Index, 190° C. | — | — | — | — | — | — | — | 2,250 | 200 | 1.6 | 4,200 | 1,700 | 20 |
| Color, Gardner Scale | 1 | 1 | 1 | 1 | 1 | 1 | 1 | 1 | 1 | 1 | 1 | 1 | 1 |
| Molecular Weight[c] | 3,000 | 2,200 | 2,300 | 1,800 | 14,000 | 2,900 | 2,100 | 8,000 | 12,000 | 23,000 | 4,000 | 8,000 | 19,000 |
| Cloud Point,[c] °C. | 85 | 79 | 87 | 77 | 104 | 69 | 97 | 77 | 81 | 84 | 75 | 78 | 81 |

[a]Saponification number
[b]Conventional Brookfield viscosity = ~1.15 × Brookfield Thermosel viscosity
[c]2% in 130° F. paraffin
[d]Solid at this temperature
The results are substantially as for Example I

EXAMPLE III

Examples I and II are repeated with no more than 10 percent dye, including "Sudan Deep Black BB", BASF, "Nigrosine Base", Ciba Geigy, or "Waxoline Red O", ICI, substituted for the pigment. The result is substantially the same as for Example I with reduced opacity of the imprint and less light stability.

EXAMPLE IV

Examples I and II are repeated with "Epolene" replaced by a low molecular weight polyethylene sold and marketed under the name "AC Polyethylene" by the Allied Chemical Company. The results are substantially the same as for Example I.

EXAMPLE V

Examples II and III are repeated with "Epolene" replaced by low molecular weight polyethylene sold under the names "El Rexene" of Northern Petrochemicals, "Rumiten" of Rumianca SPA; "Microthene" and "Petrothene" of USI Industrial. The results are substantially the same as Example I.

EXAMPLE VI

Examples I and II are repeated with the thickness of the transfer coating reduced to below 0.0002 inch and the resin component eliminated. The results are the same as for Example I.

EXAMPLE VII

Example VI is repeated with the polyolefin permitted to vary between 50 and 85 parts by weight and the pigment to vary between 15 and 50 parts by weight. The results are substantially the same as for Example V.

EXAMPLE VIII

Example VI is repeated except that the amount of polyolefin is varied between 50 and 85 parts by weight and the composition includes up to 20 percent resin by weight. The results are substantially the same as for Example V.

EXAMPLE IX

Examples I and II are repeated using at least 25 percent lower melting point polyethylene except that the resin is present in up to 20 percent by weight and is combined with wax up to 40 percent by weight. The pigment varies between 15 and 50 percent and the remainder consists of low melting point polyethylene. The results are the same as for Example I.

EXAMPLE X

Examples I and II are repeated with "Foral" replaced by Pentalyn H or Stabilite Ester 10. The results are the same as for Example I.

EXAMPLE XI

Examples I and II are repeated with "Uhlich L2550" replaced by "Black Pearls A", Cabot, "Perma Black Toner", H. Kohnstamm, or "Peerless 155 Beads", Columbian Carbon. The results are the same.

EXAMPLE XII

Examples I and II are repeated with the colored pigments, "Victoria Blue Lake", H. Kohnstamm, "Napthol Red Light 10397", Sherwin Williams, or "Lincoln Green Y", Allied Chemical, substituted for the black pigment. The results are the same.

EXAMPLE XIII

The foregoing examples are repeated using a carrier of tissue having a thickness in the range from about 0.5 to about 1 mil. The results are the same.

EXAMPLE XIV

The foregoing examples are repeated except that the coating is applied by printing rather than extrusion and the results are the same.

EXAMPLE XV

The foregoing examples are repeated incorporating a dispersing agent for the pigment. The results are the same.

EXAMPLE XVI

The foregoing examples are repeated with a release layer of crystalline wax between the carrier and the transfer layer. The results are the same.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

We claim:

1. A heat transfer laminate comprising
a cellulosic carrier, and
a transfer layer consisting of a uniform blend of pigmented polyolefin and a rosin ester applied to said carrier as a single uniform hot melt coating.

2. A heat transfer laminate in accordance with claim 1 wherein said polyolefin is polyethylene resin with a molecular weight below about 10,000.

3. A heat transfer laminate in accordance with claim 1 wherein said polyolefin has a crystallinity below about 0.1 percent.

4. A heat transfer laminate in accordance with claim 1 wherein said polyolefin has a softening point in the range from about 80° to 150° C.;
a Ring and Ball softening point in the range from about 100° to about 150° C.;
a penetration hardness for 100 grams applied for 5 seconds at 25° C. in the range from about 0.1 to about 0.5 millimeters;
a density at 25° C. in the range from about 0.8 to about 0.99 grams per cubic centimeters; and
an acid number less than about 20.0.

5. A heat transfer laminate in accordance with claim 1 wherein said polyolefin has a molecular weight in the range from about 2,000 to about 20,000; and
a cloud point in the range from about 69° to about 104° C. for 2 percent paraffin at 130° F.

6. A heat transfer laminate in accordance with claim 1 further including a crystalline wax transfer layer between said carrier and said transfer layer.

7. A heat transfer laminate in accordance with claim 1 wherein a dye is used in place of a pigment.

8. A heat transfer laminate in accordance with claim 1 wherein the viscosity of said polyolefin is below about 20 poises per second at a temperature of 125° C.

9. A heat transfer laminate in accordance with claim 1 wherein the amount of pigment varies between 15 and 50 percent; and
the amount of polyolefin varies between 50 and 85 percent.

10. A heat transfer laminate in accordance with claim 1 wherein said carrier is tissue paper with a thickness in the range from about 0.5 to about 1 mil.

11. A heat transfer laminate in accordance with claim 1 wherein the transfer coating is below about 0.0002 inch.

12. A heat transfer laminate in accordance with claim 1 including up to 20 percent resin by weight.

13. A heat laminate in accordance with claim 1 wherein the polyolefin is at least 25 percent of the composition.

* * * * *